United States Patent
Gariador et al.

(10) Patent No.: US 7,409,715 B2
(45) Date of Patent: Aug. 5, 2008

(54) MECHANISM FOR DETECTION OF ATTACKS BASED ON IMPERSONATION IN A WIRELESS NETWORK

(75) Inventors: Frederic Gariador, Ottawa (CA); Vinod Kumar Choyi, Ottawa (CA); Andrew Robison, Ottawa (CA)

(73) Assignee: Alcatel Lucent, Paris (FR)

(*) Notice: Subject to any disclaimer, the term of this patent is extended or adjusted under 35 U.S.C. 154(b) by 807 days.

(21) Appl. No.: 10/731,029

(22) Filed: Dec. 10, 2003

(65) Prior Publication Data

US 2005/0144544 A1 Jun. 30, 2005

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .......................... 726/23; 726/22
(58) Field of Classification Search .............. 726/22–23
See application file for complete search history.

(56) References Cited

U.S. PATENT DOCUMENTS

| | | | | |
|---|---|---|---|---|
| 5,561,689 A | * | 10/1996 | Fleek et al. ................. | 375/279 |
| 6,198,728 B1 | * | 3/2001 | Hulyalkar et al. ........ | 370/310.1 |
| 6,735,630 B1 | * | 5/2004 | Gelvin et al. .............. | 709/224 |
| 6,745,333 B1 | * | 6/2004 | Thomsen ..................... | 726/23 |
| 6,826,607 B1 | * | 11/2004 | Gelvin et al. .............. | 709/224 |
| 6,832,251 B1 | * | 12/2004 | Gelvin et al. .............. | 709/224 |
| 6,859,831 B1 | * | 2/2005 | Gelvin et al. .............. | 709/224 |
| 6,986,161 B2 | * | 1/2006 | Billhartz ...................... | 726/23 |
| 7,020,701 B1 | * | 3/2006 | Gelvin et al. .............. | 709/224 |
| 7,082,117 B2 | * | 7/2006 | Billhartz ..................... | 370/338 |
| 7,140,040 B2 | * | 11/2006 | McBrearty et al. ............ | 726/23 |
| 7,142,847 B2 | * | 11/2006 | Umeda et al. ................ | 455/418 |
| 7,308,705 B2 | * | 12/2007 | Gordy et al. .................... | 726/3 |
| 7,331,061 B1 | * | 2/2008 | Ramsey et al. ................ | 726/23 |
| 2002/0150228 A1 | * | 10/2002 | Umeda et al. .......... | 379/220.01 |
| 2002/0176378 A1 | * | 11/2002 | Hamilton et al. ............ | 370/328 |
| 2003/0041244 A1 | * | 2/2003 | Buttyan et al. .............. | 713/172 |
| 2003/0070084 A1 | * | 4/2003 | Satomaa et al. ............. | 713/200 |

(Continued)

FOREIGN PATENT DOCUMENTS

WO WO 03/065186 A1 8/2003

(Continued)

OTHER PUBLICATIONS

Balasubramaniyan, Jai, Jose Omar Garcia-Fernandez, E. H. Spafford, and Diego Zamboni. An Architecture for Intrusion Detection using Autonomous Agents. Department of Computer Sciences, Purdue University; Coast TR 98-05; 1998. http://citeseer.ist.psu.edu/balasubramaniyan98architecture.html.*

(Continued)

*Primary Examiner*—Nasser Moazzami
*Assistant Examiner*—David Garcia Cervetti

(57) ABSTRACT

An impersonation detection system for a wireless node of a wireless communication network is described. The system comprises an intrusion detection module for correlating the original data frames transmitted by the wireless node with incoming data frames received over the air interface. The wireless node is connected to the intrusion detection module over a secure link, for receiving a copy of the original data frames. A method for detecting impersonation based attacks at a wireless node is also disclosed.

20 Claims, 1 Drawing Sheet

U.S. PATENT DOCUMENTS

| | | |
|---|---|---|
| 2003/0135762 A1 | 7/2003 | Macaulay |
| 2003/0217289 A1* | 11/2003 | Ammon et al. ............. 713/201 |
| 2004/0028000 A1* | 2/2004 | Billhartz .................... 370/312 |
| 2004/0028016 A1* | 2/2004 | Billhartz .................... 370/338 |
| 2004/0162995 A1* | 8/2004 | Muaddi et al. .............. 713/201 |
| 2004/0190547 A1* | 9/2004 | Gordy et al. ................ 370/463 |
| 2004/0198392 A1* | 10/2004 | Harvey et al. ........... 455/456.1 |
| 2004/0213172 A1* | 10/2004 | Myers et al. ................ 370/313 |
| 2004/0215976 A1* | 10/2004 | Jain ........................... 713/201 |
| 2004/0252837 A1* | 12/2004 | Harvey et al. .............. 380/270 |
| 2005/0005031 A1* | 1/2005 | Gordy et al. ................ 709/250 |
| 2005/0037733 A1* | 2/2005 | Coleman et al. ........... 455/411 |
| 2005/0050205 A1* | 3/2005 | Gordy et al. ................ 709/227 |
| 2006/0161983 A1* | 7/2006 | Cothrell et al. ............... 726/23 |

FOREIGN PATENT DOCUMENTS

WO    WO 03/088532 A1    10/2003

OTHER PUBLICATIONS

Y. Zhang, W. Lee, and Y. Huang. Intrusion detection techniques for mobile wireless networks. ACM/Kluwer Mobile Networks and Applications (MONET), to appear 2002. http://citeseer.ist.psu.edu/zhang03intrusion.html.*

Wright, J, Detecting Wireless LAN MAC Address Spoofing, Jan. 21, 2003, XP-02330231, pp. 1-20.

Wright, Joshua, Detecting Wireless LAN MAC Address Spoofing, Polar Cove, Providence, RI.

* cited by examiner

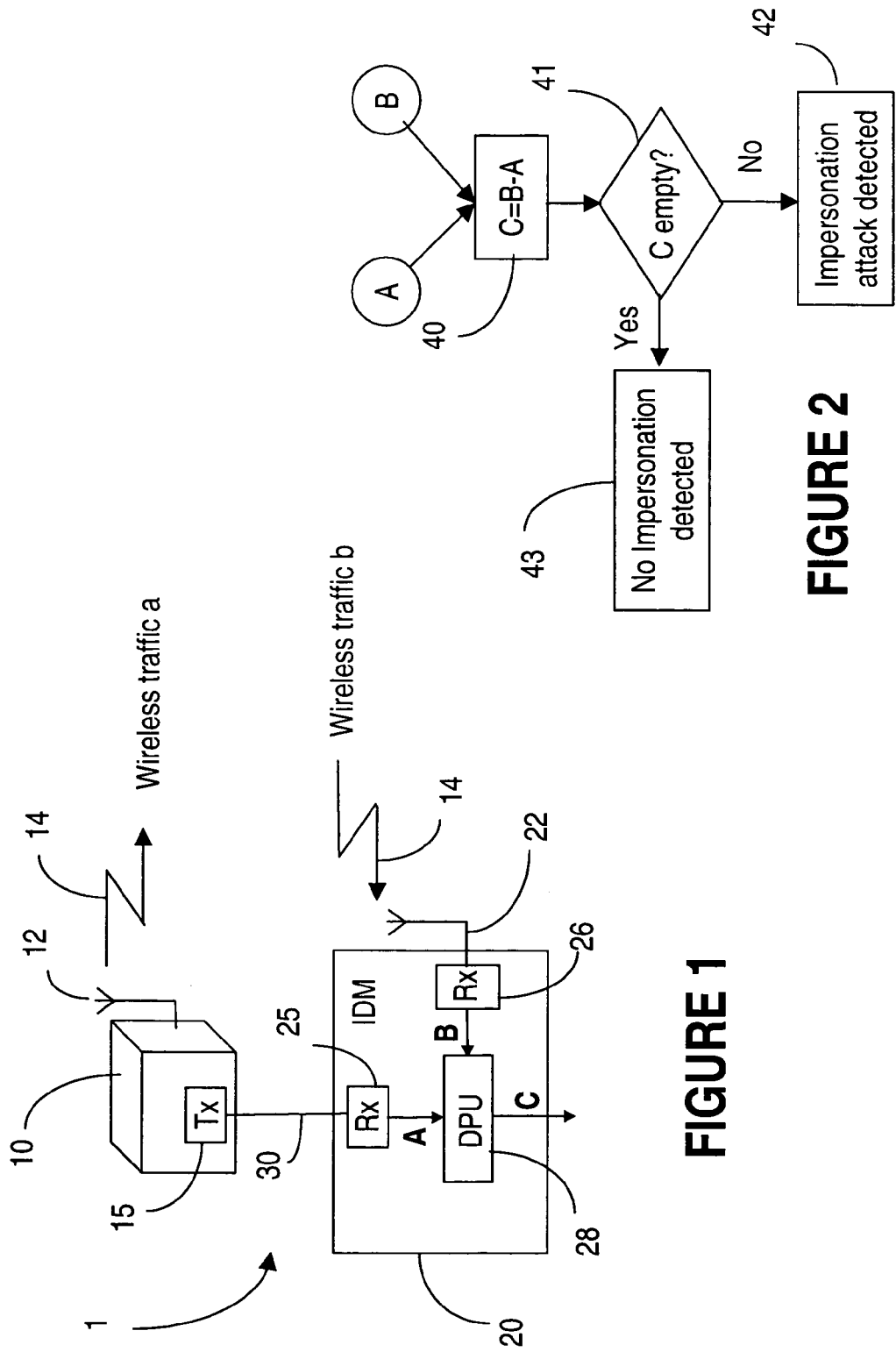

MECHANISM FOR DETECTION OF ATTACKS BASED ON IMPERSONATION IN A WIRELESS NETWORK

FIELD OF THE INVENTION

The invention is directed to intrusion detection systems and in particular to a mechanism for detection of attacks based on impersonation in a wireless network.

BACKGROUND OF THE INVENTION

Wireless Networks have become more and more prevalent over the past few years as they appeal to the end users for the convenience they provide.

Security is an issue in this kind of network as the communication media used is shared. As a result, wireless networks are particularly vulnerable to attacks at the lowest levels of the communication protocols (first and second layer of the Open Systems Interconnection (OSI) model). It is indeed very easy to tap or inject traffic into such a network.

Such attacks could be used to impersonate a wireless node in order to gain a fraudulent access to the network or, even more dangerous, to arbitrary create denial of services, or 'man in the middle' attacks by impersonating nodes that assume a special function in the network (i.e. an access point in an 802.11 network).

Traditional security systems and technologies such are firewall or IP Security (IPSec) tunnel fail to fully address those threats since they are not designed to address security threats at lower levels of the OSI model. Other mechanisms, such as address filtering performed by the wireless equipment, are useless in this environment where impersonating a valid address is so easy to do.

It is now well understood by the industry that solutions that monitor the wireless traffic to detect the above mentioned attacks bring security benefits. This explains the increasing appearance of Intrusion Detection System (IDS) in the wireless product space.

An IDS is an entity on a network that monitors a variety of system and network resources for anomalies to detect attempts to compromise the network. An IDS generally assesses if the monitored data satisfies the network rules and heuristics, mismatches indicating an attack in progress. The IDS will then advise the network user of the attack; more sophisticated IDS may launch automatic network defense counter-measures. Monitoring can take many forms and spans from low-level inspection of the data source and destination, to inspection of data packets content and monitoring the activity on a specific host.

These security services are especially important for wireless communication, due to the ease of tapping into wireless networks. In addition, since firewalls are employed on the user side of a wireless link, a message rejected by the firewall has already consumed the wireless resources required to transmit. The wireless links are supported by Radio Frequency (RF) channels, which are a scarce resource. Accordingly, messages rejected by the firewall tend to waste bandwidth which could be allocated to other connections, can drive up user cost by increasing message transmissions, and tend to slow overall throughput because of the resources required to transmit them over the wireless link.

A specificity of wireless networks is that they require IDS-like systems specific to the lower Media Access Control (MAC) layer management element (as defined by the seven-layer OSI model) while traditional IDS systems mainly focus on the third and higher layers of the OSI model.

U.S. patent application Ser. No. 2003/0135762 (Macaulay) entitled "Wireless Network Security System" and published Jul. 17, 2003, discloses an 802.11 security system for monitoring wireless networks for detecting and locating unauthorized or threatening IEEE 802.11 devices entering a user's wireless network environment or a facility not intended to support wireless networks. The security system comprises a network appliance subsystem, a portable computing subsystem and an interface between these two subsystems. The portable computing subsystem is a manually operated device, which searches for specific devices using a directional antenna and indicates when targeted (intruder) radio signals are found, and the signal strength. The network appliance subsystem is equipped with an analyzing module that looks for IEEE 802.11-specific attack patterns using real-time analysis, and contains configurations related to alert levels and security policy configurations. However, this solution relies on traffic monitoring to detect intrusion and requires duplication of all wireless interfaces used by a respective node.

In addition, existing wireless IDSs, such as the Guard product by AirDefense™, rely on a set of network probes and a specific server appliance. However, there is no correlation or consolidation between the wireless node and the IDS system.

Joshua Wight, in an article entitled "Detecting Wireless LAN MAC Address Spoofing", provides an in-depth analysis of the anomalies generated by tools that spoof MAC addresses. While knowledge of these anomalies enables an easier detection of the spoofed traffic generated by these tools, the analysis has some limitations. For example, it is based on anomalies generated by specific attack tools, which should not be considered as invariants. As well, most of the anomalies are present when random MAC addresses are used for attacks, which is not always the case.

In general, the prior art solutions rely only on wireless traffic monitoring in order to detect intrusions. Using such techniques, it is not possible to differentiate in a reliable way the legitimate traffic sent by a node (for instance the management or control frames) from the malicious traffic generated by an attacker node masquerading as the real node.

This inability to detect in a reliable way the occurrence of malicious traffic leaves wireless nodes susceptible to various types of attacks such as de-authentication, some Man in the Middle, denial of service, etc.

SUMMARY OF THE INVENTION

It is an object of the present invention to provide a mechanism for the detection of attacks based on impersonation in a wireless network.

It is another object of the invention to increase the protection of a wireless node against the class of attacks based on impersonation of a node using the physical address or other higher layer address.

Accordingly, the invention provides a method for detecting impersonation based attacks at a wireless node of a wireless communication network, comprising the steps of: a) providing an intrusion detection module with a copy of original data frames transmitted by the wireless node over a wireless interface; b) detecting at the intrusion detection module incoming data frames received over the wireless interface; and c) recognizing an impersonating attack when the information in the copy differs from the information in the incoming data frames.

The invention is also directed to an impersonation detection system for a wireless node of a wireless communication network, the node for transmitting original data frames over a wireless interface comprising: an intrusion detection module for correlating the original data frames with incoming data frames received over the air interface; and connection means between the wireless node and the intrusion detection module for providing the intrusion detection module with a copy of the original data frames.

Still further, the invention is directed to a wireless node for a wireless network comprising: means for transmitting outgoing data frames over a wireless interface; an intrusion detection module for correlating the outgoing data frames with incoming data frames received from the air interface; and a secure link between the wireless node and the intrusion detection module for providing the intrusion detection module with a copy of the outgoing data frames.

Advantageously, the detection mechanism according to the invention provides reliable detection of attacks based on impersonation of a wireless node, while it does not require any specialized, costly equipment. Minor changes in the wireless node implementation are required to publish appropriate information to the intrusion detection module; however these changes are fully offset by the increased intrusion detection reliability.

As well, it does not require any change to any wireless networking standard to operate.

This invention does not provide a full IDS solution for wireless networks, but rather aims to solve a problem, which cannot normally be solved by the existing IDS solutions.

BRIEF DESCRIPTION OF THE DRAWINGS

FIG. 1 illustrates the logical architecture of an impersonation detection system according to an embodiment of the invention; and FIG. 2 shows the attack detection process performed using the detection system of FIG. 1.

DETAILED DESCRIPTION OF THE INVENTION

This invention proposes to exploit additional information made available by the wireless node in order to enhance the intrusion detection capabilities of the wireless networks. The invention comprises an intrusion detection module connected to the wireless node under surveillance by a secure link. The wireless node sends to the intrusion detection module a copy of the traffic it sent to the wireless interface over the secure link.

For increased efficiency, this copy may not encompass all traffic processed by the wireless node. For instance, in a 802.11 network, it may only consist of management frames which by themselves enable the detection of a large variety of attacks. It may also be a summary of the traffic, which would allow statistical comparisons to be made such as differences in the number and types of the frames.

This intrusion detection module monitors the traffic transmitted over the wireless interface by the wireless node and compares it to the information about the same traffic as sent by the wireless node over the secure link. Any inconsistencies between the wireless traffic received and the information received would show suspect behavior that can be analyzed to qualify the attack. For example, if a monitored wireless node is inactive but the intrusion detection module receives wireless traffic that indicates the monitored node is the originator, then this would be a sign of suspect behavior.

FIG. 1 illustrates the logical architecture of the impersonation detection system 1 according to the invention. It shows a node 10 of a wireless communication network and an intrusion detection module IDM 20 connected to node 10 over a secure link 30. System 1 includes a respective transmitter unit 15 at node 10, connected to a receiver unit 25 at intrusion detection module 20 over secure link 30, operating according to a respective communication protocol. The language used for the exchange of information over the secure link 30 could be standardized for a better openness and for easing integration with third party intrusion detection systems available for wireless networks.

It is to be noted that the blocks shown in FIG. 1 represent the logical components of the impersonation detection system. Indeed, these blocks may be integrated in order to build a wireless node with embedded impersonation detection capabilities. In this case, the secure link between node 10 and module 20 could be replaced by inter-processes communications.

Node 10 generates original data denoted with A, which is modulated over the wireless channels that are allocated to node 10, as well known, and an antenna 12 transmits wireless traffic a over wireless interface 14. This transmission is performed in the normal fashion for the wireless technology in question; the transmission technology is not relevant to this invention. Node 10 also sends a copy of the original data A to the intrusion detection module 20 over the secure link 30. As indicated above, this copy may include only management frames, or a summary of the traffic.

The intrusion detection module 20 monitors the channels allocated to node 10 using an antenna 22. It collects wireless traffic denoted with b on FIG. 1, and a receiver 26 detects data B carried by these channels. A data processing unit DPU 28 at IDM 20 correlates data set A and data set B; an intrusion is detected when data set C is not empty.

Note that if the copy of the original data A encompasses only selected frames of the traffic processed by the wireless node, DPU 28 selects for correlation similar frames from incoming data B.

The output of DPU 28 may be used as such to alarm the node or the network management system of an intrusion. This information may also be used in conjunction with information gathered by any wireless intrusion detection system available in the respective network, and used as a means to achieve a better diagnosis of attacks going on in the wireless network.

FIG. 2 shows the attack detection process performed using the detection system of FIG. 1. As indicated above, DPU 28 (see FIG. 1) uses data A corresponding to the wireless traffic a sent by the wireless node 10 and the incoming data B corresponding to the wireless traffic b received by the intrusion detection module 20. In step 40, DPU 28 correlates these two sources of information in order to detect spoofed traffic that uses the physical address on node.

If the result C of the subtraction of the set A to the set B is not empty, as shown by branch 'No' of decision block 41, this means that an impersonation attack is going on, shown in step 42. Further analysis could be used to obtain a more accurate assessment of the attack according to the wireless protocol monitored. For instance, in the case of an 802.11 network, the detection of a forged de-authentication or disassociation 802.11 management frame can allow detection of a denial of service attack. A 'man in the middle' attack can be diagnosed, if such a packet is followed by an association to another wireless node.

Conversely, if the result C of the subtraction of the set A to the set B is empty, as shown by the 'Yes branch of decision block 41, this means that no attack has been detected, shown in step 43.

The embodiments and variations shown and described herein are merely illustrative of the principles of this inven-

We claim:

1. A method for detecting impersonation based attacks at a wireless node of a wireless communication network, comprising the steps of:
    a) operatively connecting the wireless node with an intrusion detection module and providing the intrusion detection module with a copy of original data frames transmitted by the wireless node over a wireless interface;
    b) detecting at the intrusion detection module incoming data frames received over the wireless interface;
    c) comparing at the intrusion detection module the information in the copy with the information in the incoming data frames; and
    d) recognizing an impersonating attack when the intrusion detection module determines that the information in the copy differs from the information in the incoming data frames.

2. The method of claim 1, wherein step a) comprises transmitting the copy over a secure link established between the wireless node and the intrusion detection module.

3. The method of claim 1, wherein the copy comprises only management frames.

4. The method of claim 1, wherein the copy includes a summary of the outgoing data frames.

5. The method of claim 4, wherein the summary of the outgoing data frames comprises frames that allow statistical comparisons.

6. The method of claim 4, wherein the summary comprises the number of the outgoing data frames transmitted over a time interval.

7. The method of claim 4, wherein the summary comprises the types of the original data frames.

8. The method of claim 1, wherein step b) comprises monitoring all wireless channels allocated to the wireless node and extracting the incoming data frames received over all the wireless channels allocated to the wireless node.

9. The method of claim 1, wherein step d) comprises:
    correlating the original data frames with the incoming data frames for detecting an inconsistency between the frames; and
    upon detection of the inconsistency, further processing the incoming data frames for qualifying the impersonating attack.

10. An impersonation detection system for a wireless node of a wireless communication network, the node for transmitting original data frames over a wireless interface comprising:
    an intrusion detection module for correlating the original data frames with incoming data frames received over the air interface; and
    connection means between the wireless node and the intrusion detection module for providing the intrusion detection module with a copy of the original data frames.

11. The impersonation detection system of claim 10, wherein the intrusion detection module comprises:
    a first receiving unit for receiving the copy;
    an antenna for capturing the incoming traffic received on all transmission channels allocated to the wireless node;
    a second receiving unit for detecting the incoming data frames from the incoming traffic; and
    a data processing unit for correlating the copy with the incoming data frames and generating a impersonation detection signal.

12. The impersonation detection system of claim 11, wherein the intrusion detection module further comprises means for qualifying an intrusion attack based on the impersonation detected signal.

13. The impersonation detection system of claim 12 wherein the secure link operates according to a communication protocol.

14. The impersonation detection system of claim 10, wherein the connection means comprises, when the intrusion detection module resides away from the wireless node:
    a transmitting unit on the wireless node, for transmitting the copy to the intrusion detection module; and
    a secure link for connecting the wireless node with the intrusion detection module.

15. The impersonation detection system of claim 14, wherein the secure link is established as inter-processes communication, when the intrusion detection module is integrated within the wireless node.

16. The impersonation detection system of claim 10, wherein the wireless network operates according to any wireless network technology.

17. A wireless node for a wireless network comprising:
    means for transmitting outgoing data frames over a wireless interface;
    an intrusion detection module for correlating the outgoing data frames with incoming data frames received from the air interface; and
    a secure link between the wireless node and the intrusion detection module for providing the intrusion detection module with a copy of the outgoing data frames.

18. The wireless node of claim 17, wherein the intrusion detection module comprises:
    a first receiving unit for receiving the copy of the outgoing data frames;
    an antenna for capturing the incoming traffic carried on all transmission channels allocated to the wireless node;
    a second receiving unit for detecting the incoming data frames from the incoming traffic; and
    a data processing unit for correlating the copy of the outgoing data frames with the incoming data frames and generating an impersonation detected signal.

19. The an impersonation detection system of claim 18, wherein the intrusion detection module further comprises means for qualifying an intrusion attack based on the impersonation detected signal.

20. The impersonation detection system of claim 18, wherein the wireless network operates according to any wireless network technology.

* * * * *